April 14, 1942.  C. A. STICKEL  2,279,535

REFRIGERATING APPARATUS

Filed Feb. 28, 1939

INVENTOR.
Carl A. Stickel
BY
Spencer Hardman and Fehr
ATTORNEYS

Patented Apr. 14, 1942

2,279,535

UNITED STATES PATENT OFFICE 2,279,535

REFRIGERATING APPARATUS

Carl A. Stickel, Dayton, Ohio, assignor to General Motors Corporation, Dayton, Ohio, a corporation of Delaware Application February 28, 1939, Serial No. 258,968

10 Claims. (Cl. 236—44)

This invention relates to refrigerating apparatus and more particularly to effective temperature control for air conditioning apparatus.

It has been recognized that it would be desirable to control various forms of air conditioning apparatus by an effective temperature control device. However, the effective temperature devices now available are too complicated and delicate as well as too costly and unreliable for extensive use.

It is an object of my invention to provide an extremely simple inexpensive effective temperature control for controlling air conditioning apparatus according to effective temperatures.

It is another object of my invention to provide an effective temperature control requiring only one operating bellows.

It is another object of my invention to provide an effective temperature control which is sturdy and capable of withstanding abuse and neglect.

It is still another object of my invention to provide an effective temperature control system including a bellows connected to a plurality of bulbs, one kept moistened to be responsive to wet bulb temperatures and the other kept dry, and to charge the bulb with absorbents in the proper quantity, quality and characteristics to provide a control according to the effective temperature.

Further objects and advantages of the present invention will be apparent from the following description, reference being had to the accompanying drawing, wherein a preferred form of the present invention is clearly shown.

As my invention, I have provided an effective temperature control comprising a bellows connected to two thermostatic bulbs. One of the bulbs is kept moistened by a wick and placed in an air stream so that it is kept cooled to the wet bulb temperature. The other bulb is kept dry so that it is responsive to dry bulb temperature. Each of these bulbs are connected in open communication with each other and with the operating bellows. The bulbs are preferably charged with some suitable absorbent, such as activated charcoal and the quality and quantity of the charcoal in each of the bulbs is proportioned so as to evolve a gas and produce a pressure within the bellows substantially in accordance with the effective temperature. The bellows may be used to operate a switch which controls the operation of the motor-compressor unit of a refrigerating system or it may be used to control the suction line valve in the refrigerating system or the bellows may be used to operate a gas valve or switch for a heating system.

Figure 1:
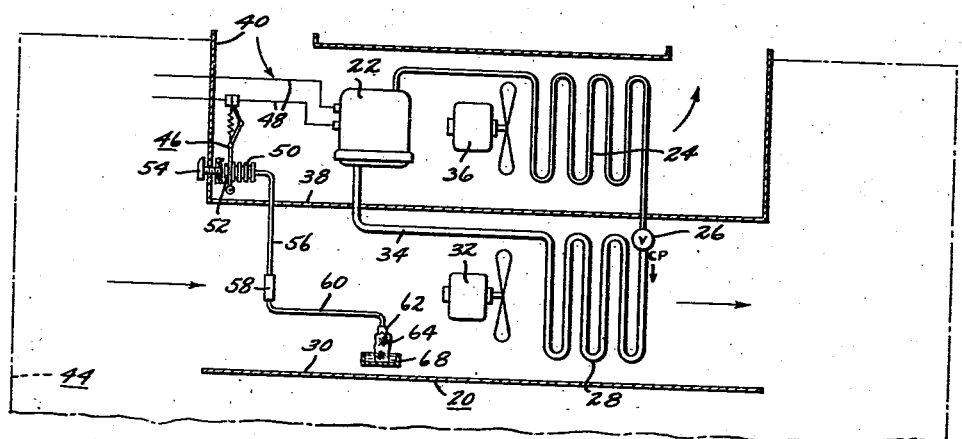
Fig. 1 is a diagrammatic view of one form of air conditioning system provided with an effective temperature control switch mechanism embodying my invention.

Referring now to the drawing and more particularly to Fig. 1, there is shown an air conditioning system, generally designated by the reference character 20, comprising a sealed motor-compressor unit 22 for compressing refrigerant and for forwarding the compressed refrigerant to a condenser 24 where the compressed refrigerant is liquefied and forwarded to an expansion valve or other suitable flow control device 26, which controls the flow of liquid refrigerant into the evaporating means 28. The evaporating means 28 is located within an air duct 30 through which air is drawn from the room 44 by an electric fan 32. The liquid refrigerant evaporates within the evaporating means 28 under reduced pressures and is returned to the compressor 22 through the return conduit 34. An electric fan 36 is provided within a duct 38 for drawing air in through an inlet 40 from the outside of the building and circulating the air over the motor-compressor unit 22 and the condenser 24 in order to cool the compressed refrigerant. This air conditioning apparatus 20 is located within room 44 to be cooled and the air from the room 44 is constantly drawn through the duct by the electric fan 32 and cooled by the evaporating means 28, after which the air is again discharged into the room.

In order to control the operation of the apparatus according to the effective temperature I provide a snap acting switch means 46 which is located in series with the supply conductors 48 which supply electric energy to the motor-compressor. The snap acting switch means 46 includes the switch contacts and a lever and snap acting mechanism shown diagrammatically. The switch 46 is provided with an adjustment which includes a compression type coil spring 52 and a manually operable screw 54 which adjusts the tension of the coil spring to change the point at which the switch 46 opens and closes. The bellows 50 is connected by a capillary tube 56 to a thermostat bulb 58, and the thermostat bulb 58 is connected by capillary tubing 60 to a second thermostat bulb 62. With this arrangement the bellows and the two bulbs are always in free open communication with each other. The second bellows 62 is provided with a wick 64 which dips into a pan of water 66 so that the wick and the bulb 62 is kept moist. The circulation of the air from the room 44 through the duct 30 evaporates the moisture from the wick 64 and the bulb 62 so as to cause the bulb 62 to be cooled down to the wet bulb temperature. The bulb 58 remains in a dry condition and therefore is subject to the dry bulb temperature of the air drawn into the duct 30 from the room 44.

In order to provide the proper proportional effect from each of the bulbs 58 and 62 in accordance with effective temperature conditions I charge the two bulbs with an absorbent such as activated charcoal in certain proportions to provide this result. For example, if it is desired to operate the control at an effective temperature of about 65° F., I provide about twice as much activated charcoal of the same quality in the dry bulb 58 as in the wet bulb 62, since at 65° effective temperature changes in the dry bulb temperature of one degree is about twice as effective in changing the effective temperature as a similar change in the wet bulb temperature. However, if for example it is desired to operate the system at about 75° effective temperature I proportion the amount of activated charcoal in the dry bulb 58 to the amount of charcoal in the wet bulb 62 about in the proportions of 5 to 4. In this way for any selected effective temperature, the amounts of charcoal may be properly proportioned to operate the control according to the effective temperature desired. For example, for a 65° effective temperature the dry bulb 58 may be charged with 1.2 grams of 60 min. 40 to 60 mesh of activated charcoal while the wet bulb may be charged with .6 gram of the same quality charcoal. If it is desired to use the control to provide an effective temperature of 75° the thermostat bulb 58 may be charged with 1 gram of activated charcoal and the wet bulb 62 may be charged with .8 gram of activated charcoal. The bellows, bulbs and connecting tubing may be charged with some suitable gas, for example, carbon dioxide or dimethyl ether which is absorbed and evolved readily from the activated charcoal according to changes in temperature.

In order to provide a control which will operate over a somewhat wider range of effective temperatures than the control just described, the dry bulb 58 may be charged with activated charcoal of a different quality than the charcoal provided in the bulb 62. Thus the dry bulb 58 may be charged with a suitable quantity of 10 min. charcoal and the bulb 58 may be made larger so as to provide a greater air space and so as to accommodate a greater amount of charcoal in order that the dry bulb 58 will evolve gas at a somewhat lesser rate according to the pressure temperature curve. That is, the 10 min. activated charcoal will have a flatter temperature curve than the 60 min. charcoal. A larger volume providing a free air space in the bulb 58 also aids in producing this flatter temperature characteristic of gas evolution since the free air will change its pressure relatively slowly with changes in temperature as compared with the pressure change produced by the change in temperature of the activated charcoal. The wet bulb 62 may be charged with high quality activated charcoal such as 60 min. charcoal in an amount sufficient to provide gas evolution in proper relation to the dry bulb 58. By constructing and charging the bulb 58 so that it will have a flatter pressure temperature curve than the wet bulb 62, a wider zone of effective temperatures can be covered by the same control since the effectiveness of the wet bulb temperatures rises more rapidly than the effectiveness of the dry bulb temperatures in their effect upon the effective temperature.

Figure 2:
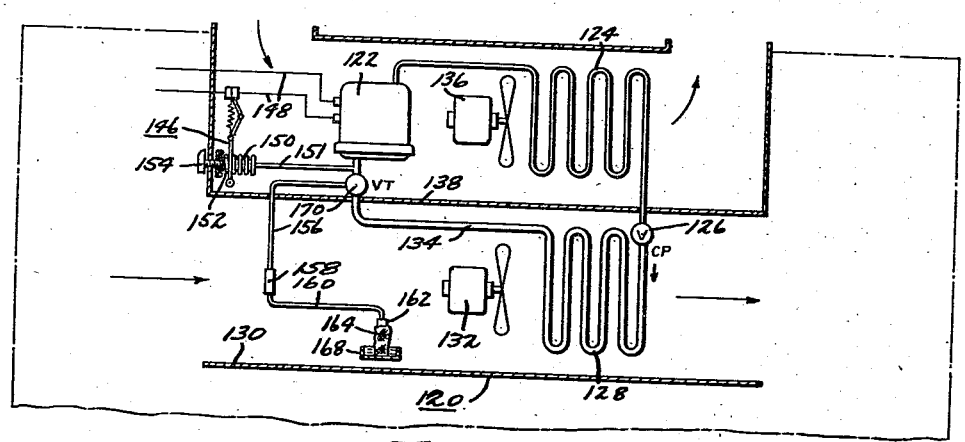
Fig. 2 is another air conditioning system provided with an effective temperature suction line valve control embodying my invention.

In Fig. 2 I have shown my improved form of effective temperature control as applied to a throttling suction line valve embodied in the suction line of an air conditioning refrigerating system substantially identical to that shown in Fig. 1. This air conditioning unit generally designated by the reference character 120 is provided with a motor-compressor unit 122, a condenser 124, an expansion valve 126, evaporating means 128 and a suction line 134. An electric fan 136 is provided for circulating air through the duct 138 which contains the motor-compressor unit and the condenser for cooling these units with outside air. An electric fan 132 is provided for drawing room air through the duct 130 in order that the evaporating means 128 may cool the air.

The circulation of refrigerant through the system is controlled by a throttling suction line valve 170 which has its operating diaphragm means connected by a capillary tubing 156 to a thermostat bulb 158 which in turn is connected by capillary tubing 160 to the thermostat bulb 162. The thermostat bulb 158 is kept dry while the thermostat bulb 162 is provided with a wick 164 which is kept moist by having its lower end in the water pan 168. These bulbs 158 and 162 are preferably filled with activated charcoal as are the bulbs 58 and 62. The amount of charcoal in the bulbs is proportioned so that they will create pressures substantially in accordance with the influence of wet and dry bulb temperatures upon the effective temperature within the range of operation desired.

If desired the thermostat bulb 158 may be filled with activated charcoal of a different grade, such as 10 min. charcoal which will have a flatter pressure temperature curve than the 60 min. charcoal normally employed in the bulbs. Other absorbents, such as "silica gel" or activated silica may be used in one or both of the bulbs as desired and proportioned in quality and quantity in order to give the desired characteristics for the wet and dry bulbs according to the effective temperature scale. This suction line form of control is particularly advantageous where extremely quiet operation of the refrigerating system is desired, since the system may be kept constantly in operation as long as refrigeration is desired and thereby the usual starting and stopping noises are avoided.

In order to provide an automatic means for stopping the system when refrigeration is no longer needed, I provide a low pressure switch 146 having a bellows 150 connected by the capillary tubing 151 to the portion of the suction line between the throttling valve 170 and the inlet to the motor-compressor unit 122. The expansion of the bellows 150 is controlled by a coil spring 152 which may be adjusted by a finger manipulating screw 154 to change the suction pressure at which the snap acting switch 146 opens the compressor motor circuit 148. With this arrangement, when the throttling valve 170 is closed or very nearly closed, indicating that refrigeration is no longer necessary, the snap acting switch 146 will be opened by virtue of the low pressure existing between the valve 170 and the compressor inlet to stop the operation of the refrigerating system.

Figure 3:
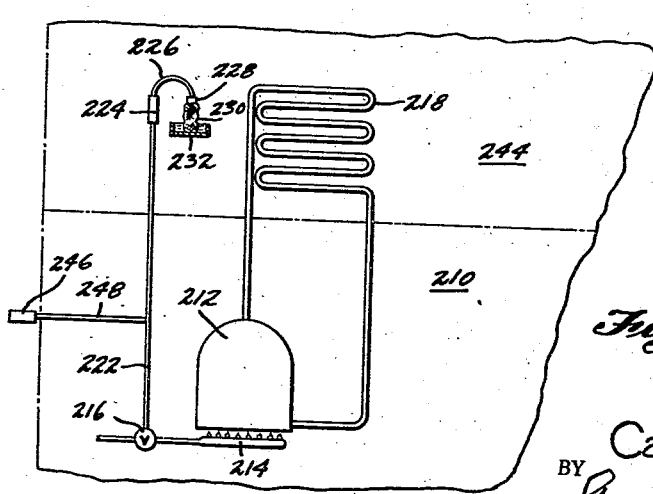
Fig 3 shows a heating system provided with an effective temperature control embodying my invention.

In Fig. 3 my effective temperature control is shown applied to a heating system. In this figure there is shown a portion of the building including a room 244 to be heated and a basement or furnace room 210 containing a boiler 212, a gas heater 214 for heating the boiler and a throttling valve 216 for controlling the supply of gas to the burner 214. The boiler 212 constitutes a portion of a hot water heating system which includes a radiator or heat transfer unit 218 located within the room 244 and which is to be heated.

The heating of the room 244 and the heating of the boiler 212 by the gas burner 214 is of course, controlled by the throttling valve 216 which is provided with an effective temperature control for controlling its operation. For this purpose a capillary tube 222 is connected to the operating diaphragm of the valve 216 and its upper end is connected to a dry thermostat bulb 224 which in turn is connected by the capillary tube 226 to the thermostat bulb 228 which is provided with a wick 230 which dips into the water pan 232 for keeping the wick 230 and the thermostat bulb 228 in a moistened condition so that the bulb 228 will be cooled to wet bulb temperatures.

As mentioned in connection with Figs. 1 and 2 the thermostat bulbs 224 and 228 are preferably charged with activated charcoal or activated silica of the proper quality and quantity in order to provide a control of the valve 216 according to the effective temperature at which it is desired to maintain the room 244. By using activated charcoal of different quality in the bulbs this control may be used over a range of effective temperatures. The valve 216 may be provided with an adjustment for this purpose substantially like the snap acting switch 46.

If desired, in addition to the effective temperature control, this control may be modified according to outside temperatures. In order to do this a thermostat bulb 246 is provided outside the building and connected by capillary tubing 248 to the capillary tubing 222. This thermostat bulb 246 is preferably charged with activated charcoal in sufficient quality and quantity to give the desired modified effects. The thermostat bulbs and the connecting tubing are preferably charged with a suitable gas, such as carbon dioxide which is absorbed and evolved from the activated charcoal in accordance with changes in temperature. However, other gases may be used and other absorbents, such as "silica gel" may be used, and different absorbents may be used in different bulbs to obtain desired effects. This system provides a very simple effective temperature control with outside modifications requiring only one gas valve with a single operating diaphragm.

While the form of embodiment of the present invention as herein disclosed, constitutes a preferred form, it is to be understood that other forms might be adopted, all coming within the scope of the claims which follow.

What is claimed is as follows:

1. In combination, an air tempering means, a control means for said air tempering means, said control means including an operating diaphragm means and a plurality of thermostat bulbs operably connected to said diaphragm means, one of said thermostat bulbs being responsive to dry bulb temperature and another being responsive substantially to wet bulb temperature, said thermostat bulb responsive to dry bulb temperature containing means for creating pressures substantially in accordance with the influence of dry bulb temperatures upon the effective temperature in the desired operating range, said thermostat bulb responsive to wet bulb temperature containing means for creating pressures substantially in accordance with the influence of wet bulb temperatures upon the effective temperature in the operating range.

2. In combination, an air tempering means, a control means for said air tempering means, said control means including an operating diaphragm means and a plurality of thermostat bulbs operably connected to said diaphragm means, one of said thermostat bulbs being responsive to dry bulb temperature and another being responsive substantially to wet bulb temperature, said thermostat bulbs responsive to dry and wet bulb temperatures being charged with absorbent material effective substantially in the proportion that dry and wet bulb temperatures influence the effective temperature in the operating range, said thermostat bulbs being charged with a gas capable of being absorbed by the absorbent material.

3. In combination, an air tempering means, a control means for said air tempering means, said control means including an operating diaphragm means and a plurality of thermostat bulbs operably connected to said diaphragm means, one of said thermostat bulbs being responsive to dry bulb temperature and another being responsive substantially to wet bulb temperature, said thermostat bulbs responsive to dry and wet bulb temperatures being charged with absorbent material effective substantially in the proportion that dry and wet bulb temperatures influence the effective temperature in the operating range, said thermostat bulbs being charged with a gas capable of being absorbed by the absorbent material, the absorbent material in one of the bulbs having a flatter pressure temperature curve in the operating range than the absorbent material in the second bulb.

4. In combination, an air tempering means, a control means for said air tempering means, said control means being provided with a pressure operating means, a plurality of thermostat bulbs and connecting tubing connected in open communication with each other and the pressure operating means, one of the bulbs being subjected to dry bulb temperature and the second to substantially the wet bulb temperature; said bulbs, connecting tubing and pressure operating means being charged with a gas, said bulbs being charged with absorbent material capable of absorbing and evolving said gas upon changes in temperature, the total effectiveness of the absorbent material in said bulbs being proportioned substantially in accordance with the influence of wet and dry bulb temperatures upon the effective temperature within the operating range.

5. In combination, an air tempering means, a control means for said air tempering means, said control means being provided with a pressure operating means, a plurality of thermostat bulbs and connecting tubing connected in open communication with each other and the pressure operating means, one of the bulbs being subjected to dry bulb temperature, and the second to substantially the wet bulb temperature; said bulbs, connecting tubing and pressure operating means being charged with a gas, said bulbs being charged with absorbent material capable of absorbing and evolving said gas upon changes in temperature, the total effectiveness of the absorbent material in said bulbs being proportioned substantially in accordance with the influence of wet and dry bulb temperatures upon the effective temperature within the operating range, the absorbent material in the dry bulb having a flatter pressure temperature curve in the operating range than the absorbent material in the wet bulb.

6. In combination, an air tempering means, a control means for said air tempering means, said control means being provided with a fluid motor operating means, a plurality of thermostat bulbs and connecting tubing connected in open communication with each other and the fluid motor operating means, one of the bulbs being subjected to dry bulb temperature and the second to substantially the wet bulb temperature; said bulbs, connecting tubing and pressure operating means being charged with a gas, said bulbs being charged with absorbent material capable of absorbing and evolving said gas upon changes in temperature, the total effectiveness of the absorbent material in said bulbs being proportioned substantially in accordance with the influence of wet and dry bulb temperatures upon the effective temperature within the operating range, said absorbent material being activated charcoal.

7. In combination, an air tempering means, a control means for said air tempering means, said control means being provided with a pressure operating means, a plurality of thermostat bulbs and connecting tubing connected in open communication with each other and the pressure operating means, one of the bulbs being subjected to dry bulb temperature and the second to substantially the wet bulb temperature; said bulbs, connecting tubing and pressure operating means being charged with a gas, said bulbs being charged with absorbent material capable of absorbing and evolving said gas upon changes in temperature, the total effectiveness of the absorbent material in said bulbs being proportioned substantially in accordance with the influence of wet and dry bulb temperatures upon the effective temperature within the operating range, said tempering means being provided for tempering the air within an enclosure, said control means being provided with a third thermostat bulb connected in open communication with the other thermostat bulbs and the operating means, said third bulb being charged with an absorbent.

8. In combination, an air tempering means, a control means for said air tempering means, said control means being provided with a pressure operating means, a plurality of thermostat bulbs and connecting tubing connected in open communication with each other and the pressure operating means, one of the bulbs being subjected to dry bulb temperature and the second to substantially the wet bulb temperature; said bulbs, connecting tubing and pressure operating means being charged with a gas, said bulbs being charged with absorbent material capable of absorbing and evolving said gas upon changes in temperature, the total effectiveness of the absorbent material in said bulbs being proportioned substantially in accordance with the influence of wet and dry bulb temperatures upon the effective temperature within the operating range, said tempering means being provided for tempering the air within an enclosure, said control means being provided with a third thermostat bulb connected in open communication with the other thermostat bulbs and the operating means, said third bulb being charged with an absorbent and being responsive to a psychrometric condition outside said enclosure.

9. In combination, an air tempering means, a control means for said air tempering means, said control means including a fluid motor operating means and a plurality of thermostat bulbs operably connected to and in open communication with each other and said operating means, said bulbs, said operating connections and said fluid motor operating means containing an operating fluid, one of said thermostat bulbs being provided with means for creating an expansion of the fluid substantially in accordance with the influence of dry bulb temperatures on the effective temperature in a desired operating range, another of said bulbs being provided with means for creating an expansion of the fluid substantially in accordance with the influence of wet bulb temperatures upon the effective temperature in an operating range.

10. In combination, an air tempering means, a control means for said air tempering means, said control means including a fluid motor operating means and a plurality of thermostat bulbs operably connected to said operating means, one of said thermostat bulbs being responsive to dry bulb temperatures and being charged with absorbent material effective substantially in the proportion that dry bulb temperatures influence the effective temperature in the operating range, another of said thermostat bulbs being responsive to wet bulb temperatures and being charged with absorbent material effective substantially in the proportion that wet bulb temperatures influence the effective temperature in the operating range, said thermostat bulbs being charged with a gas capable of being absorbed by the absorbent material.

CARL A. STICKEL.